United States Patent [19]

Beugelsdyk et al.

[11] Patent Number: 5,467,583
[45] Date of Patent: Nov. 21, 1995

[54] DUAL ACTUATOR CONTROL ASSEMBLY AND METHOD OF DUAL ACTION CONTROL ASSEMBLY UTILIZATION

[75] Inventors: Anthony F. Beugelsdyk; Michael A. Barnard, both of Wichita, Kans.

[73] Assignee: Wescon Products Company, Wichita, Kans.

[21] Appl. No.: 231,166

[22] Filed: Apr. 22, 1994

[51] Int. Cl.$^6$ ............................. A01D 69/00; A01D 75/20
[52] U.S. Cl. ..................... 56/10.8; 56/11.4; 74/501.6; 180/19.3
[58] Field of Search ................... 56/10.8, 11.1, 56/11.3, 11.4, DIG. 2; 180/19.3; 74/500.5, 501.5 R, 501.6, 502

[56] References Cited

U.S. PATENT DOCUMENTS

| | | | |
|---|---|---|---|
| 4,667,459 | 5/1987 | Scanland et al. | 56/10.8 X |
| 5,195,307 | 3/1993 | Thorud et al. | 56/11.3 |
| 5,279,101 | 1/1994 | Sueshige | 56/11.5 |
| 5,355,662 | 10/1994 | Schmidt | 180/19.3 X |

*Primary Examiner*—David J. Bagnell
*Attorney, Agent, or Firm*—Hovey, Williams, Timmons & Collins

[57] ABSTRACT

A dual action cable control apparatus (20) includes a mounting bracket (22), a first Bowden cable assembly (24), a second Bowden cable assembly (26), an elongated lever (28), and a rotatable spool (30) mounted upon one end of the lever. Spool (30) is coupled with cable assembly (24) for shifting the cable to actuate a lawn mower transmission linkage concomitant with rotation of the spool. Lever (28) is operably coupled with cable (26) for actuation of a lawn mower drive engagement control linkage concomitant with rocking of the lever. Detent assembly (34) is provided for retaining spool (30) at selected rotational positions representing lawn mower transmission settings.

16 Claims, 3 Drawing Sheets

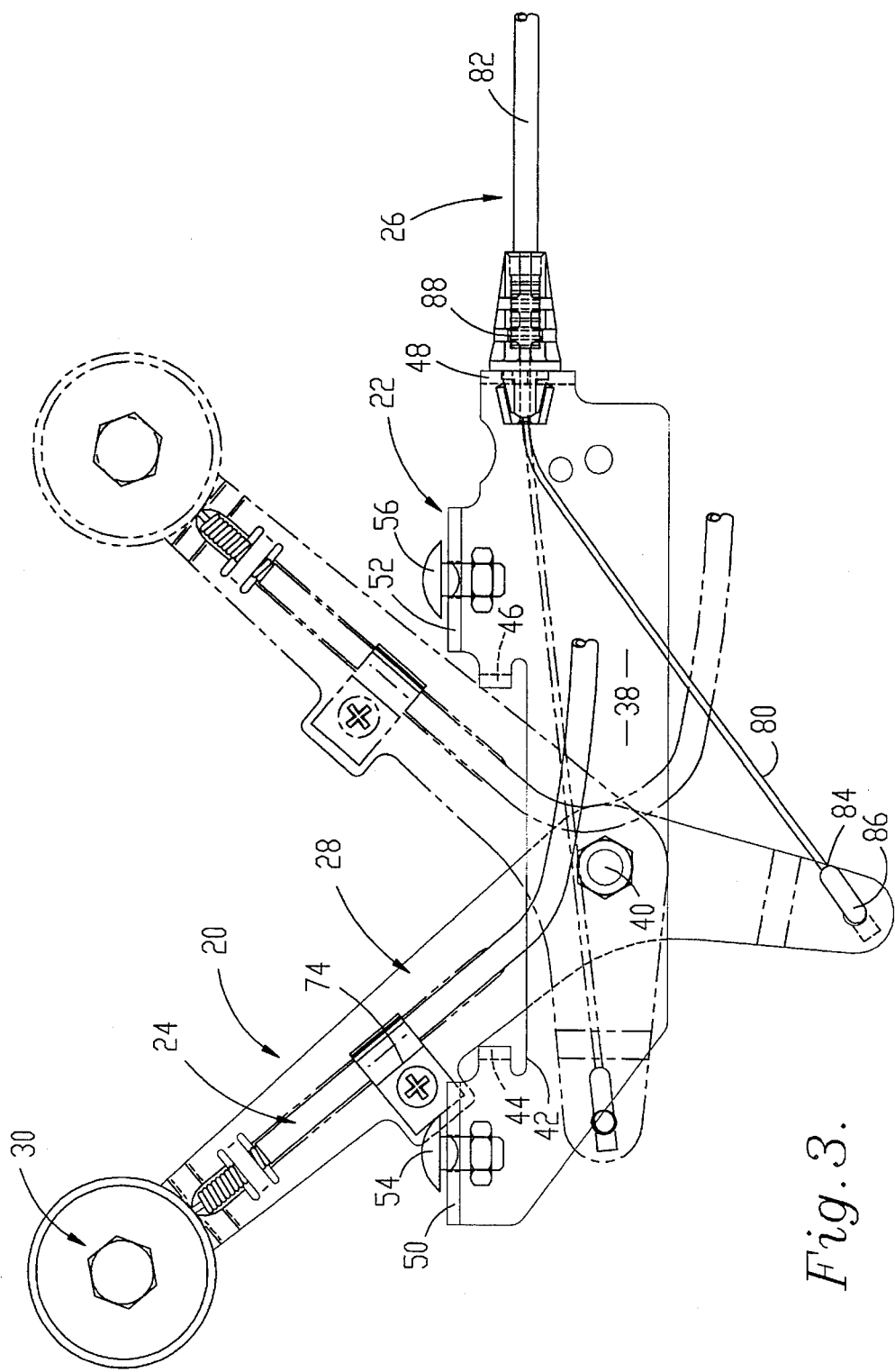

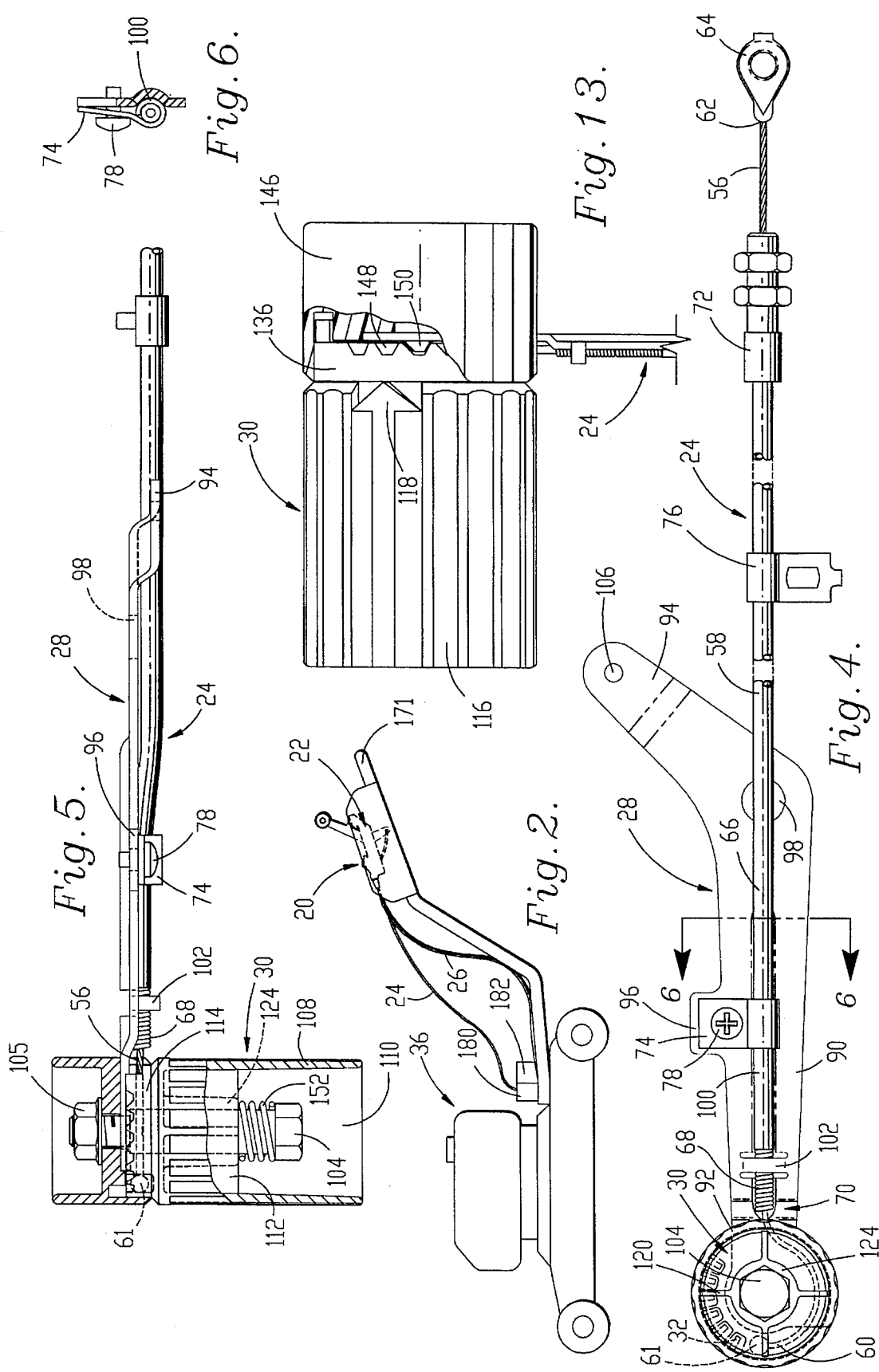

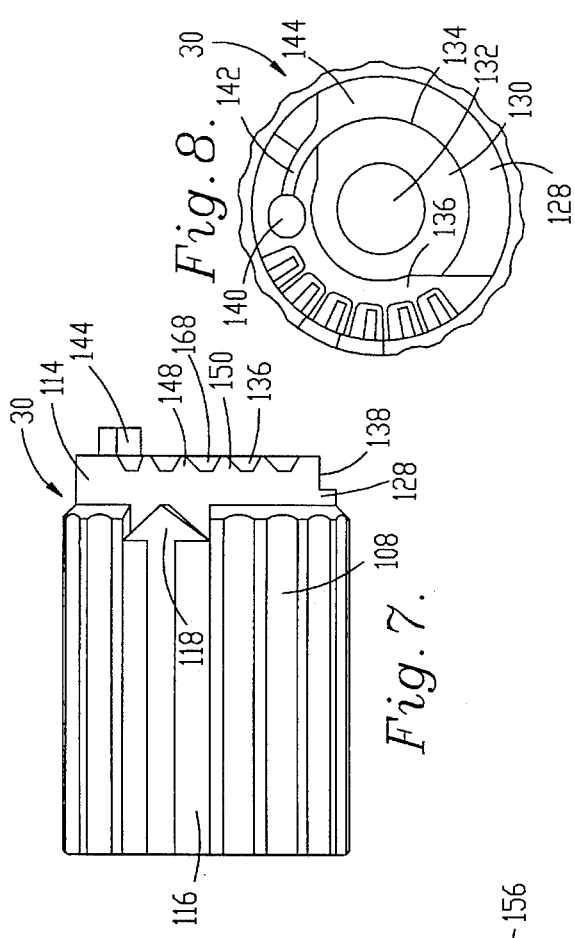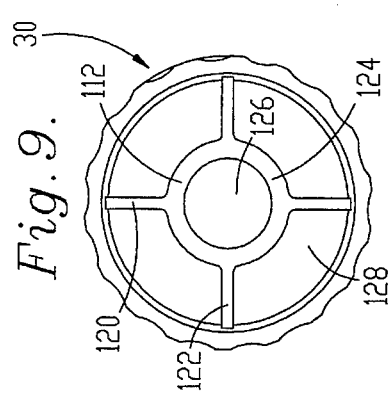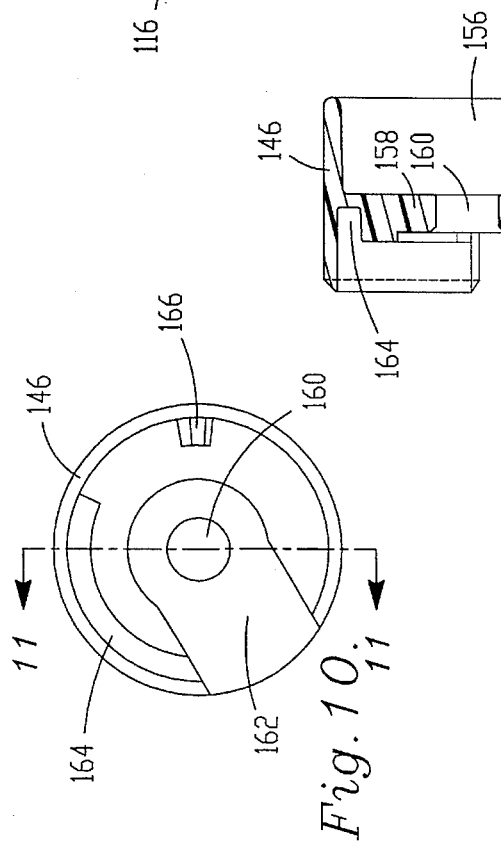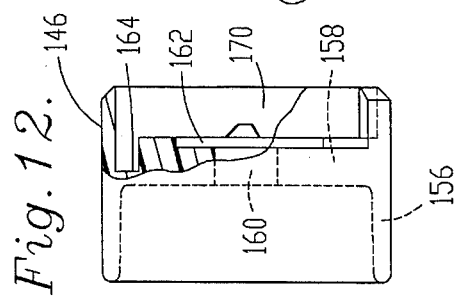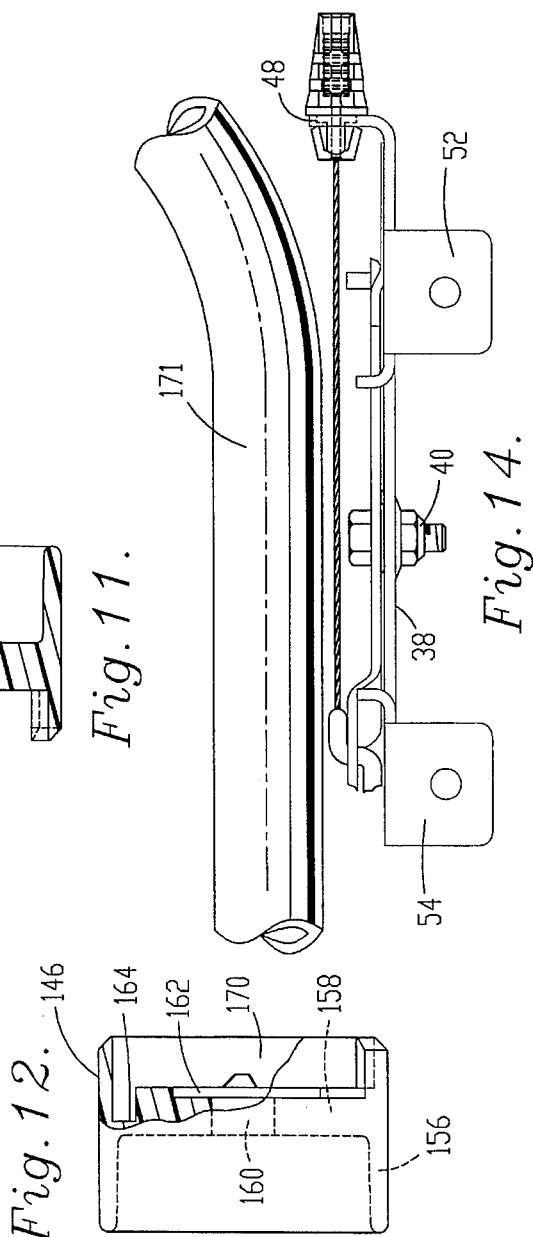

5,467,583

DUAL ACTUATOR CONTROL ASSEMBLY AND METHOD OF DUAL ACTION CONTROL ASSEMBLY UTILIZATION

BACKGROUND OF THE INVENTION

1. Field of the Invention

The invention pertains to the field of cable control linkages, and particularly those that may be utilized to actuate cable controlled linkages of self propelled conveyances such as the transmission control or drive engagement control linkages of a lawn mower. More particularly, the dual action cable control apparatus hereof pertains to a single lever multiple control assembly for actuating a plurality of Bowden cable assemblies to perform independent control functions. The dual control assembly may be used according to a method of actuating lawn mower transmission and drive engagement linkages from a single lever.

2. Description of the Prior Art

A variety of commercially available conveyances, such as self-propelled snow blowers and lawn mowers, utilize a plurality of independently operated Bowden cables for actuating various types of control linkages. The Bowden cables each include shiftable cables made of a single wire or a plurality of wound wires, which are partially received for reinforcement within tubular sheaths. One of the cable ends is typically coupled with the a control linkage, such as a conventional transmission or drive engagement control linkage, while the other end is connected to an elongated pivotal lever for actuating the cable and the control linkage. For example, in a walk-behind lawn mower having a throttle control, a three speed transmission, and a drive engage/disengage control, each of the Bowden cables operating the respective controls would be coupled with a separate pivotal lever for actuating the cable, i.e., one lever for each cable. These numerous control levers are normally mounted upon the operator's handle.

The proliferation of numerous controls typically increases the complexity of the apparatus, as well as the operator's corresponding apprehensions pertaining to the difficulty of using the controls. In fact, this perceived complexity may often be responsible for buying decisions where purchasers preferentially choose a less functional (and less complex) conveyance having relatively fewer levers than does a more complicated sister conveyance. Furthermore, the simultaneous manipulation of these multiple levers requires multiple hands, which are otherwise needed for steering and pushing. Additionally, the time required to manipulate the several controls may create operational difficulties even for experienced operators, such as when a speed reduction is necessary to avoid stalling as a mower enters tall grass at high speed.

Yet another problem involves the difficulty of ergonomically arranging the controls on the operator's handle. By way of example, placing three or four levers together in immediate succession makes the middle lever(s) difficult to grasp, but spacing one or two levers apart from the others on the opposite side of the handle also imposes the awkwardness of requiring separate hands for operating all of the levers.

SUMMARY OF THE INVENTION

The invention resolves the problems that are outlined above by providing a dual action cable control apparatus employing a single lever coupled with a twistable spool assembly that enables a solo hand to simultaneously manipulate dual independent controls. For example, a single hand may disengage a lawn mower drive mechanism by rocking the lever and, simultaneously, shifting the transmission by rotating a knob control mounted upon one end of the lever. This control apparatus greatly simplifies control operations, and provides additional operational capabilities such as expedited drive engagement and transmission shifting with less potential for stalling due, for example, to engine lugging associated with high speed cutting in tall grass.

The dual action cable control apparatus is adapted for attachment to a conveyance, such as a self-propelled lawn mower, and broadly includes a first cable assembly including a shiftable first cable operably coupled with a rotatable cable-receiving spool presenting an axis of rotation and operably coupled with the first cable and a second cable assembly coupled with a rockable lever for shifting the second cable. The spool is mounted upon the lever for allowing rotation of the spool around the axis, and for shifting of the first cable. Preferred embodiments include a detent assembly for releasable retaining the spool at selected rotational positions.

The apparatus described above may be utilized according to a method including the steps of shifting a spool rotatably mounted to a lever to cause responsive shifting of a first cable operatively interconnecting the spool and the first cable controllable mechanism; and shifting a lever to cause responsive shifting of a second cable operatively interconnecting the lever and the second cable-controllable mechanism.

BRIEF DESCRIPTION OF THE DRAWINGS

FIG. 1 is a front perspective view of a dual action cable control apparatus of the invention;

FIG. 2 is a left side elevational view depicting the FIG. 1 apparatus installed on a lawn mower;

FIG. 3 is a right side view depicting the FIG. 1 apparatus mounted upon a lawn mower handle bracket;

FIG. 4 is a right side view of the FIG. 1 apparatus detached from the mower and depicting a rockable lever at a rearward position with a forward lever position illustrated by a dashed line;

FIG. 5 is a top plan view of a cable spool assembly mounted upon a control lever, and including a partial sectional view taken through the spool and the flange of the control lever;

FIG. 6 is a sectional view of the cable sheath mounting assembly taken along line 6—6 of FIG. 4;

FIG. 7 is a front elevational view of the spool depicting a portion of the a detent assembly for limiting rotational motion of the spool;

FIG. 8 is a left side elevational view of the spool of FIG. 7;

FIG. 9 is a right side elevational view of the spool of FIG. 7;

FIG. 10 is a left side elevational view of a first end of a rockable control lever mounted proximal to the spool;

FIG. 11 is a sectional view taken along line 11—11 of FIG. 10 and depicting structure for receiving the detent assembly as well as portions of the spool;

FIG. 12 is a broken rear elevational view of the spool-receiving first end;

FIG. 13 is a front elevational view depicting a mating engagement between the spool and the first end of the lever; and FIG. 14 is a top plan view depicting a mounting bracket for installing the dual action control apparatus upon a lawn mower handle.

DETAILED DESCRIPTION OF THE PREFERRED EMBODIMENT

Referring now to the drawings, FIG. 1 depicts the dual action cable control apparatus 20 of the present invention mounted to a lawn mower handle for controlling the transmission shifting and drive engagement linkages thereof. FIGS. 3 and 4 depict dual action cable control apparatus 20 in greater detail including mounting bracket 22 for supporting apparatus 20, first Bowden cable assembly 24 for actuating a lawn mower transmission shifting linkage, second Bowden cable assembly 26 for actuating a lawn mower drive engagement or clutch control linkage, rockable lever 28, rotatable spool 30, and detent assembly 32 (FIG. 4) for retaining spool 30 at selected rotational positions. Apparatus 20 may be mounted upon, for example, lawn mower 36 as depicted in FIGS. 1 and 2.

FIGS. 3 and 14 best depict mounting bracket 22, which includes an elongated main body panel 38 having a substantially central aperture for receiving bolt 40 and an uppermost slot 42 into which extend inward protrusions 44 and 46. Bolt 40 defines a pivot axis about which lever 28 pivots. Apertured cable-mounting platform 48 is integrally formed with panel 38, and forms a plane extending normally in relationship to the plane of panel 38 for receiving cable assembly 26. Similarly, apertured ears 50 and 52 extend normally with respect to panel 38 and receive respective bolt assemblies 54 and 56.

FIG. 4 depicts first Bowden cable assembly 24, which includes first shiftable cable 56 formed of flexible twisted wire and having an intermediate section received within flexible first tubular sheath 58. Cable 56 presents a first end 60 coupled with spool 30. The first end of cable 56 is retaining ball 61, and a second end 62 is joined with apertured transmission control coupling 64. Sheath 58 has an outer covering formed of a synthetic resin and an interior core 68 formed of wound wire which is exposed at spool end 70 by removal of covering 66. Sheath 58 also provides threaded coupling 72 at an end remote from end 70. Clamps 74 and 76 retain sheath 58 at a fixed position relative to cable 56 by receiving corresponding threaded members, e.g. screw 78, for frictional retention of sheath 58 against appropriate support structure as depicted in FIG. 6.

Second Bowden cable assembly 26 is best depicted in FIG. 3 and includes second shiftable cable 80 formed of flexible twisted wire partially received within tubular sheath 82 which is formed of an outer covering and wound wire core identical to that of sheath 58. Cable 80 includes a primary end 84 having a rigid angle bracket 86 for connecting cable 80 to lever 28. Cable 80 also includes a secondary end (not depicted) opposed from end 84 and providing a drive engagement control coupling identical to transmission control coupling 64. Sheath 82 includes threaded coupling 88 for connecting sheath 82 with platform 48 for retention of sheath 82 at a fixed position relative to cable 80.

An elongated lever 28 (FIG. 4) includes a middle section 90 integrally connecting an upper end portion 92 for mounting spool 30 and a lower end portion 94 for operably coupling with cable 80. Section 90 includes reinforcing nib 96 for retaining clamp 74, hole 98 for receiving bolt 40 (FIG. 3), and groove 100 (see also FIG. 6) running with the axis of elongation in section 90 for partially retaining sheath 58 in conjunction with clamp 74. Band 102 rises outwardly away from the wall of section 90 and across groove 100 to form an opening for receiving and clamping spool end 70 of sheath 58. Upper end portion 92 provides an aperture for receiving bolt 104 threaded into nut 105 to retain spool 30. Lower end portion 94 extends from section 90 at an oblique angle relative thereto, and provides aperture 106 for engaging rigid member 86.

FIGS. 5, 7, 8, and 9 depict spool 30 which includes outer tubular wall 108 defining interior cavity 110, an interior mounting bracket 112 press fitted within cavity 110 proximal to lever 28, and reel portion 114. Wall 108 has a knurled outer perimeter 116 which also includes transmission position indicator arrow 118 (FIG. 7). Mounting bracket 112 (FIG. 9) has four spokes, e.g. spokes 120 and 122, meeting a central rim 124 which defines a central opening 126 for receiving bolt 104. Reel portion 114 (FIG. 8) includes side wall 128 abutting spoked mounting bracket 112 and integrally formed with tubular protrusion 130 having central aperture 132 aligned with opening 126 for receiving bolt 104. Protrusion 130 rises toward lever 28 from wall 128 and presents a circular, cable-engaging reel surface 134. Arcuate wall 136 extends toward lever 28 a greater distance than does side wall 128 to form a gap 138 between wall 128 and lever 28 (see FIGS. 7 and 8). Wall 136 contains oval recess 140 which communicates with recessed slot 142 for retention of cable 56 and ball 61. Stop protrusion 144 rises from wall 136 to occupy a position most proximal to lever 28.

Detent assembly 32 is depicted in FIGS. 5 and 13, and includes portions of spool 30 coupled with detent flange 146 through spring-mounted bolt 104. Wall 136 has a plurality of beveled teeth, e.g., teeth 148 and 150, protruding towards lever 28, which are biased into engagement with flange 146 by the compressive force exerted by coiled spring 152 against bolt 104 and rim 124.

FIGS. 10, 11, and 12 depict flange 146 which includes a tubular outer flange wall 156 having interior tubular surfaces connected by a middle wall 158. Wall 158 includes a central hole 160 for receiving bolt 104 and an arcuate recess 162 corresponding to the dimensions of upper end portion 92 84 of lever 28. Wall 158 also includes a protrusion-receiving cavity 164 corresponding to the dimensions of protrusion 144 of spool 30 (see FIG. 7) and traveling along an arc of about 80°. A single beveled nib 166 rises from wall 158 toward spool 30, and has dimensions sufficient to be received within a gap, e.g. gap 168, between adjacent teeth on wall 136. Wall 156 extends beyond wall 158 toward spool 30 to present flange cavity 170 having dimensions sufficient to receive reel portion 114 of spool 30 within cavity 170.

Apparatus 20 may be mounted upon a lawn mower handle 171 as depicted in FIGS. 1, 2, and 14. FIG. 1 depicts apparatus 20 having a bracket 22 installed underneath a control panel 172 of mower 36. Panel 172 includes panel apertures 174 and 176 superimposed over corresponding apertures in the bracket. Lever 28 rises through panel slot 178 which allows for rocking of lever 28 between the rearward position depicted in FIG. 1 and the forward position indicated by the dashed line in FIG. 3. The transmission control coupling and drive engagement control coupling of respective cables 56 and 80 may be attached to a conventional transmission control linkage 180, as well as a conventional drive engagement control linkage 182 for selectively engaging and disengaging the self-propelled drive train of mower 36.

While linkages 180 and 182 may be any linkage, they preferably include offset driven disk power takeoff assemblies, such as the mulching mowers that are manufactured as Model Numbers 34022, 34023, and 34024 by Gardenway of Troy, N.Y. This type of conventional linkage (not depicted) includes a first disk keyed to the engine drive shaft, and a second disk is mounted at a right angle with respect to the first disk for taking power from the first disk to drive a transaxle. The second disk typically has a rubber outer perimeter for frictionally contacting a face of the first disk, and the transaxle rotational rate increases at a given engine rpm as the second disk is shifted radially and outwardly away from the center of the first disk. The drive mechanism may be completely disengaged by pulling the second disk away from the face of the first disk, thereby breaking frictional contact between the first and second disks.

In operation, before the engine of mower 36 has been cranked, with lever 28 in a position to disengage the drive train of mower 36, spool 30 may be manually rotated around bolt 104 until arrow 118 indicates that the transmission is in the neutral position (alternatively, the drive may be completely disengaged by rocking lever 28).

Once the engine is running, spool 30 may be selectively rotated to a preordained position representing a fixed relationship between the power takeoff power drive disks, i.e., to shift gears by rotating nib 166 towards engagement with a new gap (like gap 168) for selective adjustment of cable 24. This rotation causes the beveled walls of nib 166 to rise upwardly along the correspondingly beveled walls of adjacent teeth, e.g. teeth 148 and 150, thus compressing spring 152 to move spool 30 away from lever 28 and disengaging nib 166 from gap 168. This rotation also causes recess 140 to exert force on ball 61 for shifting of cable 56 between a first position and a second position relative to sheath 58 concomitant with rotation of spool 30; however, stop protrusion 144, which is received within cavity 164, prevents the attainment of transmission shifting movement outside of useful ranges by limiting the rotation of spool 30 to an approximate 80° arc. It should be noted that the provision of an 80° arc is not critical, and protrusion 144 may limit rotation to any arc less than 360°.

The shifting of cable 56 serves to adjust the transmission of mower 36 as cable 56 is selectively wound and unwound around reel surface 134. Similarly, rocking of lever 28 between rearward and forward positions causes a concomitant shifting or extension and retraction of cable 80 relative to sheath 82 for a corresponding disengagement and engagement of the mower drive mechanism. Advantageously, the two cables 56 and 80 are entirely independent in their operation, and thus rocking of the lever 28, alone, has no effect on the control function or operation of spool 30.

Once the above-described dual action apparatus has been installed, the lawn mower may be operated according to a method including the steps of grasping spool 30 and exerting force upon spool 30, while maintaining a grasp thereon, to actuate lever 28 between its forward and rearward positions for drive engagement mechanism control while simultaneously rotating spool 30 for transmission control. This operation may be conducted with a single hand and, once spool 30 has been grasped, with a single arm motion that does not require the operator to release the lawn mower handle.

The control assembly 20 hereof has been described in connection with the operation of a self-propelled lawn mower, but it will be readily appreciated that the applications are not so limited, and that the control assembly 20 may be used in a variety of cable control applications where it is desirable to control two separate functions with a single control lever. These combinations may include, by way of example, drive engagement/throttle control combinations or blade engagement/drive engagement combinations.

Those skilled in the art will understand that the preferred embodiments, as described hereinabove, may be subjected to obvious modifications without departing from the true scope and spirit of the invention. Accordingly, the inventors hereby state their intention to rely upon the Doctrine of Equivalents, in order to protect their full rights in the invention.

We claim:

1. A dual action cable control apparatus comprising:

a support base;

a first cable assembly including a shiftable first cable presenting opposed ends connected by an intermediate section, and a rotatable cable-receiving spool presenting an axis of rotation and operably coupled with said first cable; and a second cable assembly including a shiftable second cable operably coupled with a rockable lever providing means for shifting said second cable between a forward position and a rearward position with respect to said support base;

means mounting said spool upon said lever for rotation of said spool around said axis and for shifting of said first cable between a first position and a second position concomitant with rotation of said spool.

2. The apparatus as set forth in claim 1, said spool mounting means including a lever having a middle section connecting an upper end portion and a lower end portion, said lower end portion coupled with said second cable, said upper end portion coupled with said spool.

3. The apparatus as set forth in claim 2, including means mounting said middle section for simultaneous shifting of said first and second cables respectively due to rotation of said spool and rocking motion of said lever.

4. The apparatus as set forth in claim 3, including said first cable operably coupled with a transmission control, said second cable operably coupled with a drive engagement control.

5. The apparatus as set forth in claim 1, said spool mounting means including means for detachably retaining said spool at a plurality of selected rotational positions corresponding to shifting of said first cable.

6. The apparatus as set forth in claim 5, said retaining means including a detent assembly having a plate having a wall substantially normal to said axis of rotation and a plurality of teeth protruding from said wall in a direction substantially parallel with said axis of rotation, and a spring biasing a nib into engagement with selected ones of said teeth.

7. The apparatus as set forth in claim 6, said retaining means further including means for limiting rotation to an arc less than 360°.

8. The apparatus as set forth in claim 7, said rotation limiting means including said spool having a stop protrusion received within a recess allowing rotational movement of said protrusion along said arc.

9. The apparatus as set forth in claim 1, said first cable assembly including a first Bowden cable, said second cable assembly including a second Bowden cable.

10. A self propelled conveyance having a dual action cable control apparatus comprising:

a self propelled conveyance having a transmission control linkage and a drive engagement control linkage;

a lever operably coupled with said conveyance and presenting an upper end portion and a lower end portion;

a spool presenting an axis of rotation;

means mounting said spool upon said upper end portion for rotation of said spool around said axis;

a first cable assembly including a shiftable first cable operably coupled with said spool for shifting of said first cable between first and second positions relative to said spool and operably coupled with said transmission control for actuation thereof; and a second cable assembly including a shiftable second cable operably coupled with said lever for shifting of said second cable between extended and retracted positions with said lever and operably coupled with said drive engagement control for actuation thereof.

11. The apparatus as set forth in claim 10, said spool mounting means including means for detachably retaining said spool at a plurality of selected rotational positions corresponding to shifted positions of said first cable.

12. The apparatus as set forth in claim 11, said retaining means including a detent assembly having a plate having a wall substantially normal to said axis of rotation and a plurality of teeth protruding from said wall in a direction substantially parallel with said axis of rotation, and a spring biasing a nib into engagement with selected ones of said teeth.

13. The apparatus as set forth in claim 11, said spool mounting means including a stud connecting said lever and said spool through said axis.

14. A method of selectively and independently actuating first and second of cable-controllable mechanisms of an apparatus, said method comprising the steps of:

providing a lever and a spool rotatably mounted to said lever, shifting a spool rotatably mounted to said lever to cause responsive shifting of a first cable operatively interconnecting said spool and said first cable controllable mechanism;

shifting said lever to cause responsive shifting of a second cable operatively interconnecting said lever and said second cable-controllable mechanism.

15. The method as set forth in claim 14, wherein said first cable is a Bowden cable, and wherein shifting of said lever produces no corresponding shifting of said first cable-controllable mechanism.

16. The method as set forth in claim 14, wherein shifting of said spool is performed simultaneously with shifting of said lever.

* * * * *